United States Patent
Salfelner

(10) Patent No.: US 7,646,195 B2
(45) Date of Patent: Jan. 12, 2010

(54) APPARATUS AND METHOD FOR SENSING ROTATION OF A WHEEL

(75) Inventor: Anton Salfelner, Pernegg (AT)

(73) Assignee: Infineon Technologies AG, Munich (DE)

( * ) Notice: Subject to any disclaimer, the term of this patent is extended or adjusted under 35 U.S.C. 154(b) by 781 days.

(21) Appl. No.: 10/932,929

(22) Filed: Sep. 2, 2004

(65) Prior Publication Data

US 2005/0093539 A1    May 5, 2005

(30) Foreign Application Priority Data

Sep. 2, 2003   (DE) ............... 103 40 408
Oct. 24, 2003  (DE) ............... 103 49 617

(51) Int. Cl.
*G01R 33/02* (2006.01)
*G01B 7/30* (2006.01)
*G01P 3/42* (2006.01)

(52) U.S. Cl. ............. 324/244; 324/207.25; 324/160

(58) Field of Classification Search ........... 324/207.25, 324/244, 160
See application file for complete search history.

(56) References Cited

U.S. PATENT DOCUMENTS

| 4,788,645 A | * | 11/1988 | Zavoli et al. ............ 701/207 |
| 5,040,122 A | * | 8/1991 | Neukirchner et al. ....... 701/207 |
| 5,764,137 A | * | 6/1998 | Zarkhin ................. 340/444 |
| 6,157,342 A | * | 12/2000 | Okude et al. ........... 342/357.13 |
| 6,445,286 B1 | | 9/2002 | Kessler et al. |
| 7,106,053 B2 | * | 9/2006 | Desbiolles ............ 324/207.25 |

FOREIGN PATENT DOCUMENTS

| DE | 198 56 860 A1 | 6/2000 |
| DE | 101 17 920 A1 | 10/2002 |
| WO | WO 2004/110793 | * 6/2004 |

* cited by examiner

*Primary Examiner*—Reena Aurora
(74) *Attorney, Agent, or Firm*—Maginot, Moore & Beck

(57) ABSTRACT

An apparatus for sensing rotation of a wheel includes a sensor and a detector. The sensor is disposed in a wheel, and is operable to detect the earth magnetic field. The detector is operable to detect a change of a sensed earth magnetic field in order to sense rotation of the wheel based on the detected change.

12 Claims, 6 Drawing Sheets

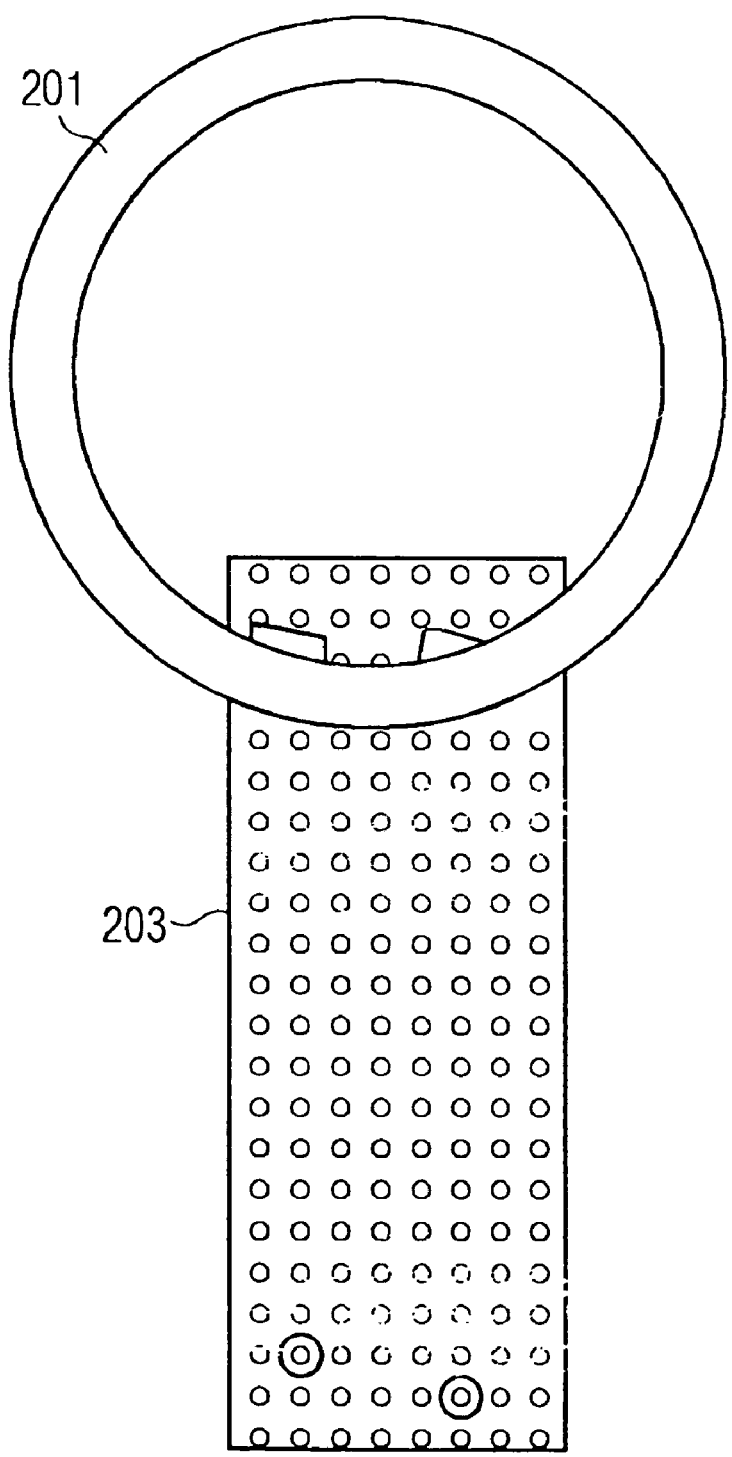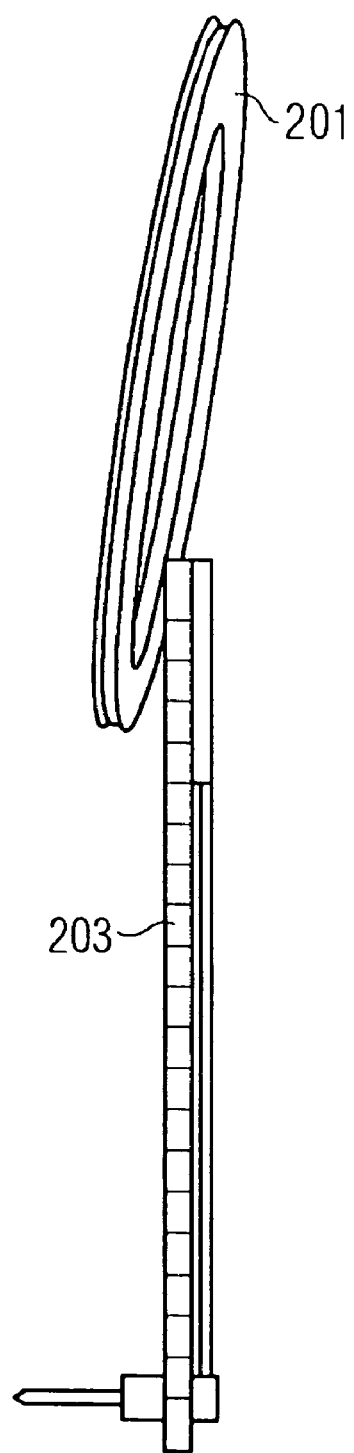

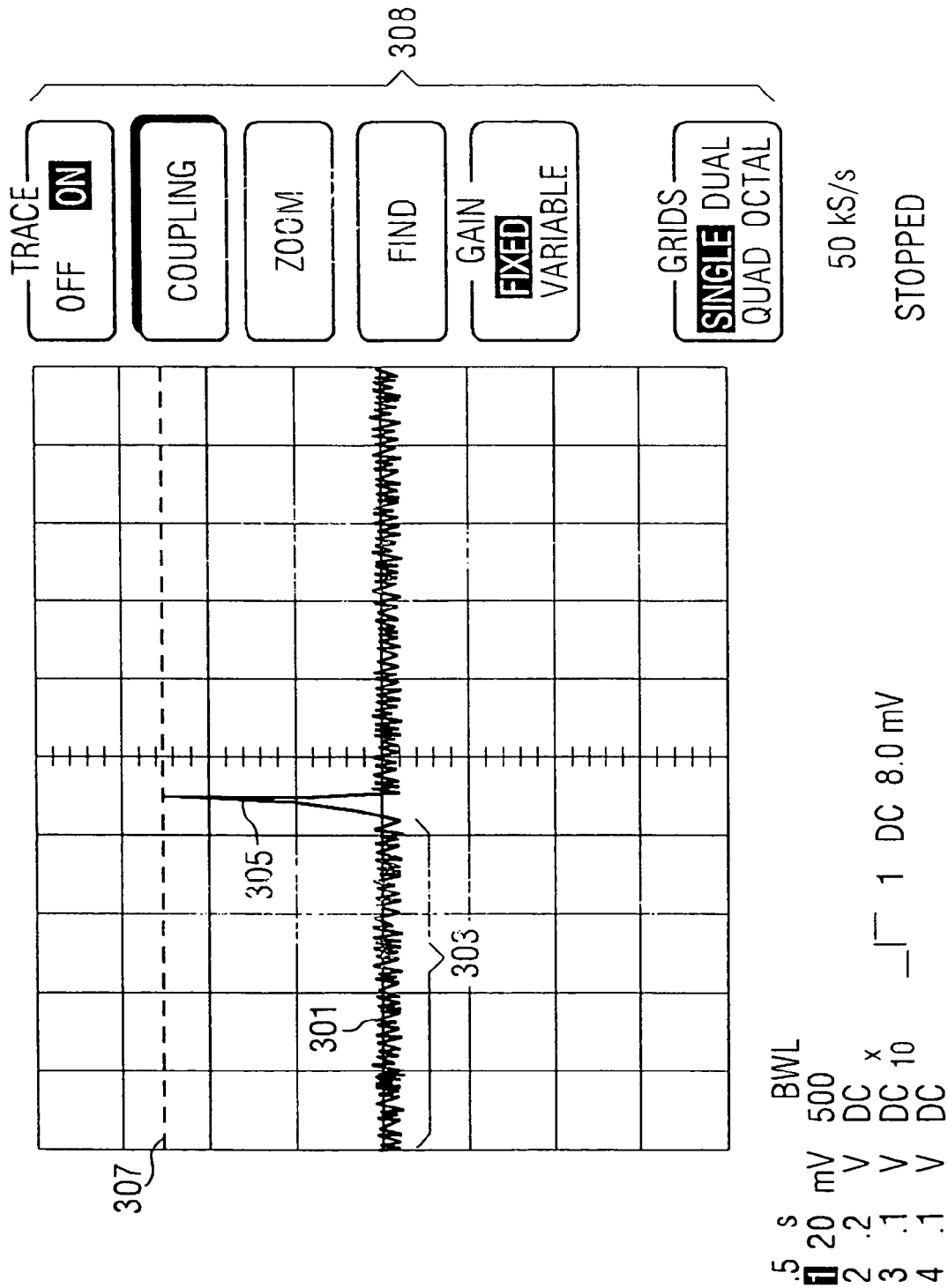

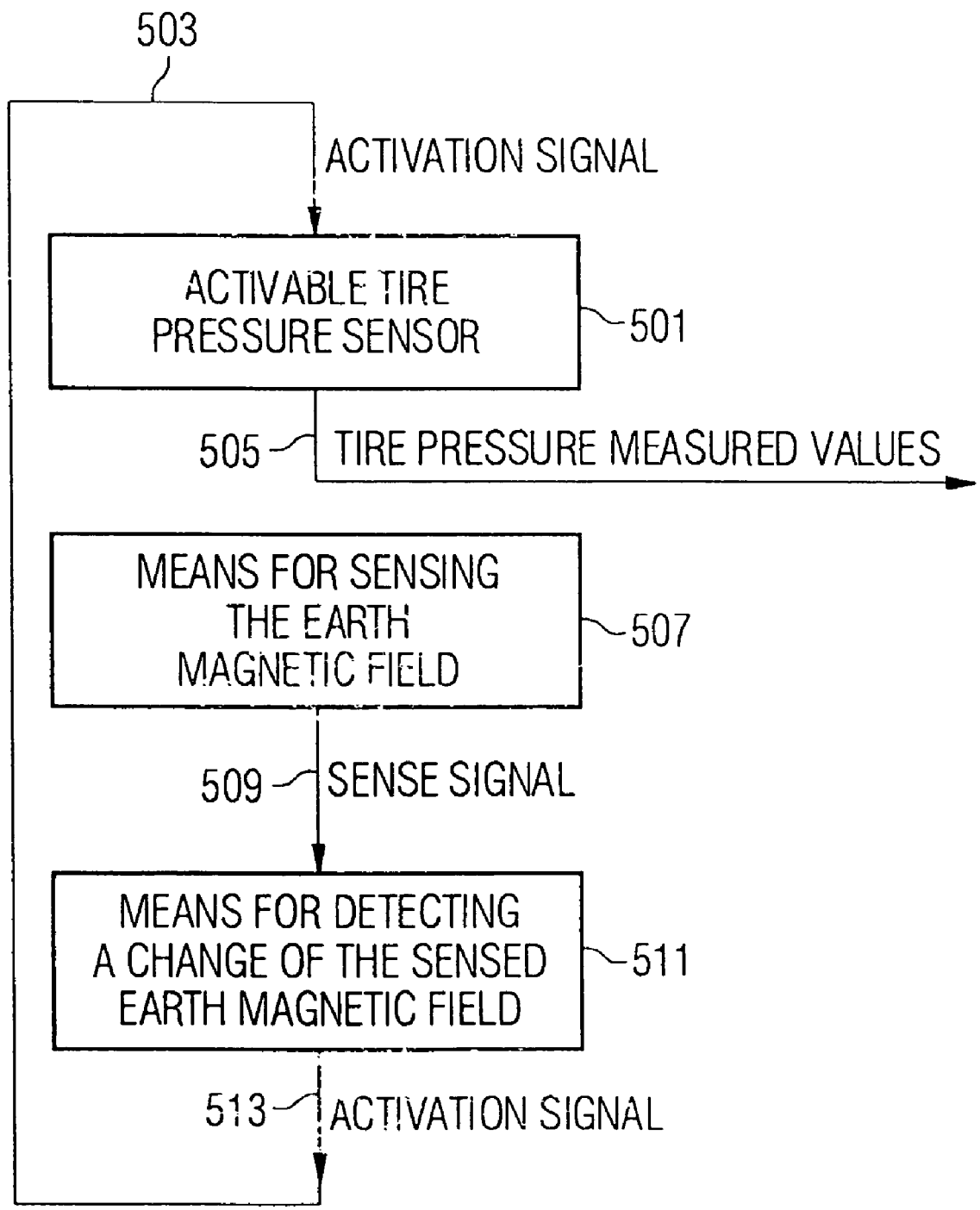

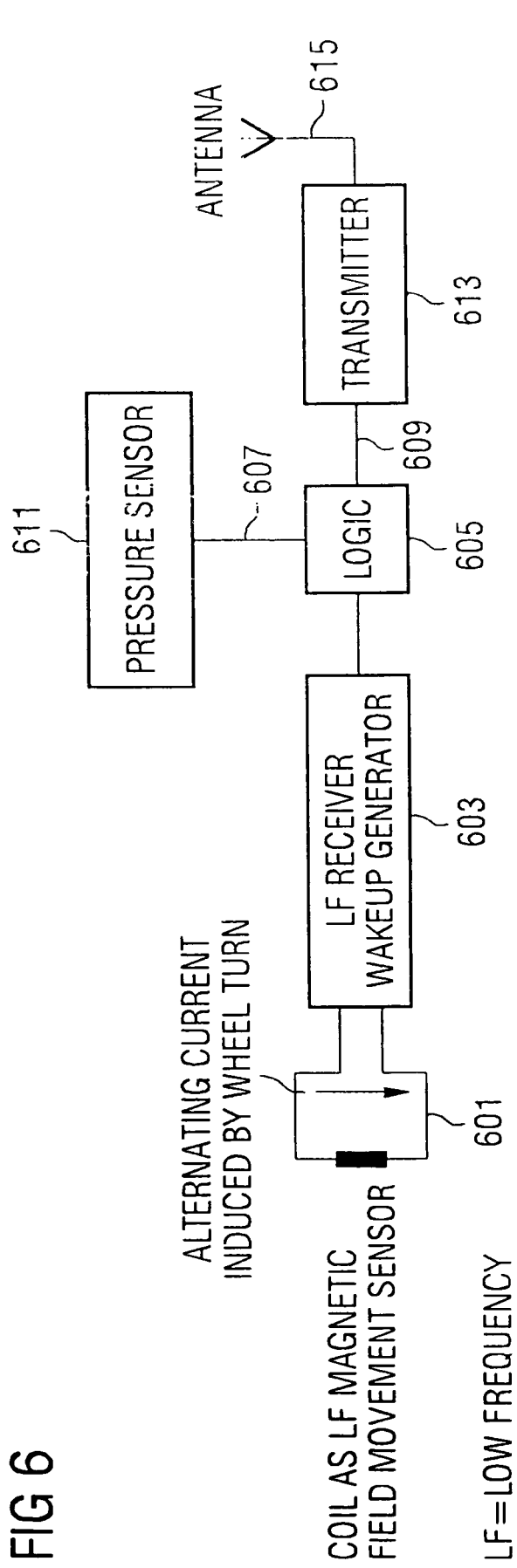

APPARATUS AND METHOD FOR SENSING ROTATION OF A WHEEL

CROSS-REFERENCE TO RELATED APPLICATION

This application claims priority from German Patent Application No. 10349617.3, which was filed on Oct. 24, 2003, and is incorporated herein by reference in its entirety.

BACKGROUND OF THE INVENTION

1. Field of the Invention

The present invention relates to apparatus and methods for sensing rotation of a wheel, which is in particular a wheel of a vehicle.

2. Description of the Related Art

In modern vehicles, a plurality of vehicle subsystems is employed, which are for example activated depending on a vehicle movement state. The vehicle subsystems may for example be tire pressure sensors, which are disposed in a tire and supplied by a battery. Preferably, such systems are therefore not activated before the vehicle is set in motion in order to lower energy consumption and thus realize more inexpensive electronic systems.

In tire pressure control systems, tire pressure sensors are built in the tires of the vehicle in order to measure the tire pressures of the respective wheels preferably during vehicle movement and then send them for example to a central evaluating unit. To this end, a sensor with a radio frequency transmitter is built in an interior space of the wheel, for example. In the vehicle there is a receiver evaluating the radio frequency data sent out from the wheel and informing the driver about the current tire pressure. The sensor (a module) in the wheel is mostly supplied from a battery intended to last for example ten years. The module therefore is only allowed to send when this is necessary, i.e. when the vehicle is in motion. For this reason additional sensors are employed in the wheel module, which sense vehicle movement.

For sensing movement of the vehicle, centrifugal force sensors may be employed. Here, a centrifugal force is exerted on the module by rotation of the wheel. By evaluation of the centrifugal force, it may now be ascertained whether the wheel is moving, the movement is permanent, or the wheel is in the rest state. The centrifugal force sensors may either be mechanical or electrical. In a mechanical solution, for example a spring is compressed by a small weight, whereby for example an electric contact closes. Disadvantageous in this approach, however, is short life, since the spring return forces become lower and lower with increasing usage. It is also disadvantageous in this approach that the electric contacts are closed mechanically. With this, there may be contact problems when for example the contacts are oxidized or when for example contact transition resistance becomes too large.

With the electrical solution, various acceleration sensors are employed, such as piezoelectric sensors, in which due to mechanical deformation an electric signal is provided, which indicates the wheel movement. Disadvantageous in this concept, however, are the high costs caused both by the piezoelectric devices and by the complex evaluating electronics.

For activating the tire pressure sensors action systems, so-called wakeup systems, may also be employed. Here, activation signals are sent from a transmitter disposed in a wheel housing to a receiver built in the wheel module. If the receiver in the wheel module gets a request signal, which has been sent out from the vehicle, the wheel module sends the pressure data from the wheel to the vehicle. Disadvantageous in this approach, however, is that a complicated receiver has to be built in the wheel module. On the one hand, thereby system costs are increased. On the other hand system operation costs thereby increase, because the receiver in the wheel module constantly requires energy to be able to receive the activation signal at any time. This reduces the life of the module. Furthermore, a battery with large capacity is needed to provide the required amount of energy. Moreover, a transmitter, which is built in the vehicle to wake up the module wheel, is costly and expensive to integrate in the vehicle systems.

For activating the tire pressure sensor, pressure versus time (waveform) in the wheel may also be analyzed. When driving away for example the temperature and the pressure in the wheel tire change. This change may be evaluated by logic integrated in the sensor, for example, which activates the transmitter. It is disadvantageous here, however, that the sensor constantly measures the pressure and the temperature. Hereby increased current consumption arises, which has to be covered by a larger and thus more expensive battery. Moreover, the technology required for this is complex and parameter-dependent, so that a stable system performance is not guaranteed in every vehicle situation. This is for example the case when, depending on roadway surface and driving performance, the pressure differences are great and quickly variable, so that the evaluating logic does not achieve a stable state, which may lead to the system not reacting, for example. This leads to the further disadvantage that such systems are not safe.

SUMMARY OF THE INVENTION

It is the object of the present invention to provide an efficient concept for sensing rotation of a wheel.

In accordance with a first aspect, the present invention provides an apparatus for sensing rotation of a wheel, having a sensor for sensing the earth magnetic field, disposed in the wheel, and a detector for detecting a change of a sensed earth magnetic field in order to sense rotation of the wheel based on the detected change.

In accordance with a second aspect, the present invention provides a tire pressure sensor system for sensing tire pressure at a rotation of a wheel, having an activatable tire pressure sensor for sensing the tire pressure, wherein the activatable tire pressure sensor is formed to receive an activation signal and sense the tire pressure in response to the activation signal, and an apparatus for sensing the rotation of the wheel, having a sensor for sensing the earth magnetic field, disposed in the wheel, and a detector for detecting a change of a sensed earth magnetic field in order to sense rotation of the wheel based on the detected change, wherein the sensor for sensing the rotation of the wheel is formed to provide the activation signal.

In accordance with a third aspect, the present invention provides a method of sensing rotation of a wheel, with the steps of sensing the earth magnetic field, detecting a change of the sensed earth magnetic field, and sensing the rotation of the wheel based on the detected change of the sensed earth magnetic field.

In accordance with a fourth aspect, the present invention provides a method of sensing tire pressure at rotation of a wheel, with the steps of sensing the tire pressure in response to an activation signal, generating the activation signal by a method of sensing rotation of a wheel, with the steps of sensing the earth magnetic field, detecting a change of the sensed earth magnetic field, and sensing the rotation of the wheel based on the detected change of the sensed earth magnetic field.

In accordance with a fifth aspect, the present invention provides a computer program with a program code for performing, when the program is executed on a computer, a method of sensing rotation of a wheel, with the steps of sensing the earth magnetic field, detecting a change of the sensed earth magnetic field, and sensing the rotation of the wheel based on the detected change of the sensed earth magnetic field.

The present invention is based on the finding that rotation of a wheel may take place on the basis of a change of the sensed earth magnetic field. According to the invention, at first the earth magnetic field is sensed, wherein the sensed earth magnetic field may be output in form of a signal, for example a voltage. If the earth magnetic field is sensed by means for sensing disposed in the wheel, for example by a magnetic field sensor, the sensor output signal is variable at movement of the wheel, because the sensed earth magnetic field changes depending on the movement and on sensor position. On the basis of this change of the sensed earth magnetic field, now for example an activation signal may be provided, which for example activates the tire pressure sensor.

Due to the change of the sensor output signal characterizing a change of the sensed earth magnetic field, apart from a pure detection of the rotation also its velocity may be sensed. If the wheel for example rotates at constant speed, the sensor output signal for example includes an oscillation with a frequency depending on the rotation speed. If this frequency is now sensed, the rotation speed or alternatively the vehicle speed may be inferred therefrom.

If a magnetic field sensor is used for example for sensing the earth magnetic field, an amplitude of the signal supplied by the sensor is also dependent on the speed of change at a change of the sensed earth magnetic field, for example in form of an induced voltage. The speed of change again depends on the rotation speed, or in other words the speed of the vehicle due to the law of induction.

One advantage of the present invention is that rotation movement of a wheel may be recognized for example by a wheel sensor in which the inventive apparatus is built in. This takes place in an especially energy-efficient manner, since here no signals are received or sent out actively. Rather, the already permanently existing earth magnetic field is taken advantage of. The change of the sensed earth magnetic field caused due to the wheel rotation already indicates wheel rotation.

Another advantage of the present invention is that no mechanically deformable sensors are used for detecting wheel rotation. Compared with the traditional concept, the inventive apparatus thus has longer life as well as lower costs.

Another advantage of the present invention is to be seen in that the structure of the inventive apparatus is simple. The inventive means for sensing the earth magnetic field may for example be embodied as simple magnetic field sensor, such as a coil. Apart from a reduction of the complexity, it is achieved with this that compared with known concepts according to the prior art the system costs may be lowered further.

Another advantage of the present invention is to be seen in that the inventive approach may not only be used for pure detection of rotation. It is rather also possible to infer vehicle speed or a change thereof from the change of the sensed earth magnetic field.

BRIEF DESCRIPTION OF THE DRAWINGS

These and other objects and features of the present invention will become clear from the following description taken in conjunction with the accompanying drawings, in which:

FIG. 2A is an embodiment of a realization form of the inventive apparatus for sensing the earth magnetic field, front view;

FIG. 2B is the embodiment from FIG. 2A, side view;

FIG. 3 is a measurement result;

FIG. 5 is an embodiment of an inventive tire pressure sensor system; and

FIG. 6 is another embodiment of an apparatus for sensing rotation of a wheel.

DESCRIPTION OF THE PREFERRED EMBODIMENTS

Figure 1A:
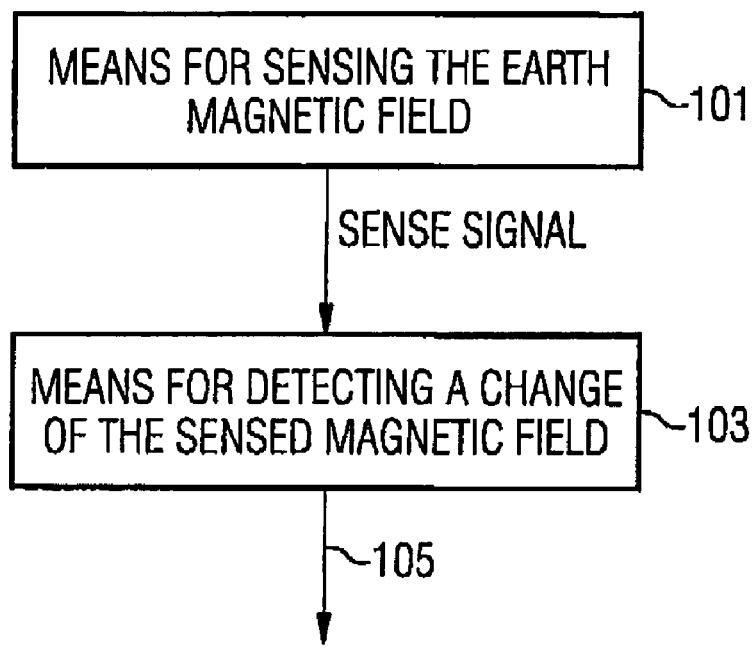
FIG. 1A is a block diagram of an inventive apparatus for sensing rotation of a wheel according to a preferred embodiment.

FIG. 1A shows a block diagram of an inventive apparatus for sensing rotation of a wheel according to a first embodiment.

The apparatus shown in FIG. 1A includes means 101 for sensing the earth magnetic field. The means 101 for sensing the earth magnetic field has an output at which a sense signal can be output. Means 103 for detecting a change of the sensed magnetic field is coupled with the output of the means 101 for sensing the earth magnetic field. The means 103 for detecting the change has an output 105, at which a signal can be output indicating the change of the sensed magnetic field.

In the following, the functioning of the structure shown in FIG. 1A shows a block diagram of an inventive apparatus for sensing rotation of a wheel according to a first embodiment.

Figure 1B:
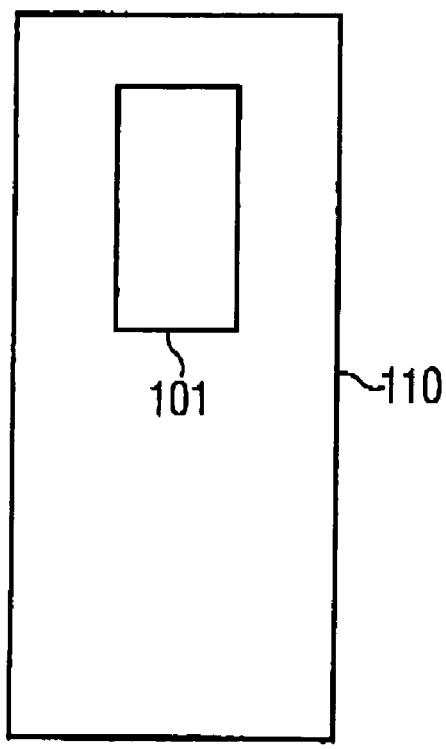
FIG. 1B shows a means for sensing the earth magnetic field 101 within a wheel 110.

The means 101 for sensing the earth magnetic field includes for example a magnetic field sensor, e.g. a Hall sensor or a coil. The magnetic field sensor senses the (permanently present) earth magnetic field. If the inventive apparatus is for example built in a wheel 110, as shown in FIG. 1B, the sensed earth magnetic field changes at a rotational movement of the wheel, which is output in form of a magnetic field sensor signal (sense signal). If the means 101 for sensing the earth magnetic field includes for example a coil already mentioned as magnetic field sensor, at movement of the wheel a voltage is induced in the coil, which can already be output as a sense signal. Due to the law of induction, the voltage induced in the coil is influenced by the number of coil windings, by the cross sectional area thereof intersecting the earth magnetic field, as well as rotation speed, i.e. the rate of change. If the coil already mentioned is employed as earth magnetic field sensor, wheel rotation or vehicle movement may already be detected or sensed on the basis of a presence of a coil output signal, which may directly be the sense signal. The inventive approach, however, applies with arbitrary magnetic field sensors, because these provide a variable output signal (sense signal) depending on position as well as on change thereof with reference to the earth magnetic field lines.

The inventive means 101 for sensing the earth magnetic field may for example comprise a pre-amplifier in order to amplify the sensor output signal and to output the amplified sensor output signal as the sense signal.

Independently of whether the sense signal includes the amplified sensor output signal or the sense signal already directly is the sensor output signal, the means 101 for sensing the earth magnetic field is in principle formed to provide a sense signal characterizing the change of the sensed earth magnetic field. At this point it should be pointed out that the term "change of the sensed earth magnetic field" does not refer to the change of the earth magnetic field itself. Due to movement the sensed earth magnetic field changes, however, due to momentary wheel position.

As it has already been mentioned, the inventive means 101 for sensing the earth magnetic field may provide the sense signal, which includes, apart from the presence of rotation, also information on speed of the vehicle. For example, the means 101 for sensing the earth magnetic field provides a sense signal comprising an amplitude and/or frequency dependent on the change of the sensed earth magnetic field. If for example the magnetic field sensor is embodied in form of a coil, the sense signal based on the coil output signal comprises a sinusoidal course, whose frequency and amplitude are proportional to the rotation speed of the wheel, and thus the speed of the car.

The sense signal is supplied to the means 103 for detecting the change of the sensed magnetic field.

The means 103 for detecting the change may for example be a sensor, which uses already a presence of the sense signal or a presence of a change of the sense signal for the pure detection of the rotation of the wheel. Such a detector may for example be a transistor controlled by the sense signal, which closes a circuit for example at presence of the sense signal, so that a current flowing through the transistor indicates the wheel rotation. On the other hand, if a change of the sense signal is used for the detection of the wheel rotation, this change may for example be detected by generating a signal indicating the change. For this, for example subtraction of the momentary sense signal from a reference sense signal may be performed, wherein the reference sense signal reflects the sense signal in rest position of the wheel. Alternatively, subtraction of the momentary sense signal from an earlier sense signal may be performed here to detect the change.

If the means 103 for detecting, however, apart from the pure wheel rotation detection, is also supposed to provide a statement on rotation speed, the inventive means 103 for detecting may comprise means for evaluating the sense signal or for evaluating the change of the sense signal in order to sense the rotation speed of the wheel or its change based on one of the features indicating the rotation speed, e.g. amplitude and/or frequency of the sense signal. As it has already been mentioned, the sense signal comprises amplitude and/or frequency dependent on the change of the sensed earth magnetic field. Based on the amplitude and/or frequency, the means for evaluating not illustrated in FIG. 1 senses the accompanying rotation speed of the wheel or a vehicle speed proportionally dependent on the rotation speed of the wheel.

In FIG. 2A, an embodiment of a realization of an earth magnetic field sensor in form of a coil is illustrated in top view. FIG. 2B shows a side view of the arrangement illustrated in FIG. 2A.

In FIG. 2A a coil 201 with for example 200 windings is mounted on a hole raster board 203. As can be seen from FIG. 2A or 2B, the inventive embodiment of an earth magnetic field sensor is simple and inexpensive. Already with this simple approach, changes of the earth magnetic field sensed by the coil 201 may be detected in form of a coil signal.

FIG. 3 shows a measurement result, wherein the arrangement illustrated in FIGS. 2A and 2B has been used as earth magnetic field sensor in the measurement. The coil was attached to an oscilloscope via an amplifier and manually turned by 180 degrees. This manual turning was meant to simulate rotation of the wheel. Due to the earth magnetic field and the movement of the coil in the earth magnetic field, a voltage was induced indicating the change of the sensed earth magnetic field. The voltage course 301 comprises a first section 303, during which the coil was not moved, whereby a rest state of a wheel was simulated. At the turning of the coil, a signal pulse 305 formed, whose amplitude is characterized by the horizontal line 307 illustrated in FIG. 3 in a broken manner. The measured amplitude is about 50 uV at an overall pulse duration of 0.2 seconds.

The display areas 308 arranged to the right of the diagram reflect the mode of operation of the measuring device used.

As it has already been mentioned, at a continuous turning of the wheel, instead of the pulse illustrated in FIG. 3 a sinusoidal signal (a sine) will arise. The frequency and amplitude of this signal is proportional to the speed of the car due to the law of induction. The waveform may be received and evaluated with the aid of a suitable evaluating unit in order to provide for example an activation signal "waking up" a tire pressure sensor. If the car is for example traveling at 50 km/h, frequency of the accompanying sense signal is about 10 Hz.

Due to the field strength of the earth magnetic field (about 50 μTesla), according to the invention, a coil is preferably used for sensing the earth magnetic field, because the earth magnetic field comparably has high field strength. For example, the maximally allowable magnetic field of a monitor at 0.5 m distance is only 200 nTesla. The magnetic field of a conductor flown through with 10 A is also only 200 nTesla at 1 m distance. The two above comparative values thus lie below the indicated earth magnetic field strength by the factor 250.

The amplitude measured in FIG. 3 of about 50 mV may however be too low, depending on sensitivity of the evaluating devices attached to the coil. This problem may for example be solved by increasing the sensitivity of a low frequency receiver (LF receiver) receiving the voltage by a predetermined factor, e.g. by a factor of 7. The current consumption would only increase minimally, such as by about 1 percent. A change in the sensitivity of the low frequency receiver receiving and evaluating the sense signal (coil signal) may already be performed during a design phase of the low frequency receiver in a cost-neutral manner.

According to a further embodiment of the present invention, a higher signal amplitude may however be accomplished when the magnetic field sensor employed for sensing the earth magnetic field is placed in a further rotation in addition to the wheel rotation. For example, the means 101 for sensing the earth magnetic field illustrated in FIG. 1 comprises means for placing the earth magnetic field sensor in a further rotation in order to obtain a sense signal based on the change of the sensed earth magnetic field, which has a higher amplitude than an amplitude of a sense signal at deactivation of the means for placing the earth magnetic field sensor in the further rotation or at an absence of the last-named means.

Figure 4:
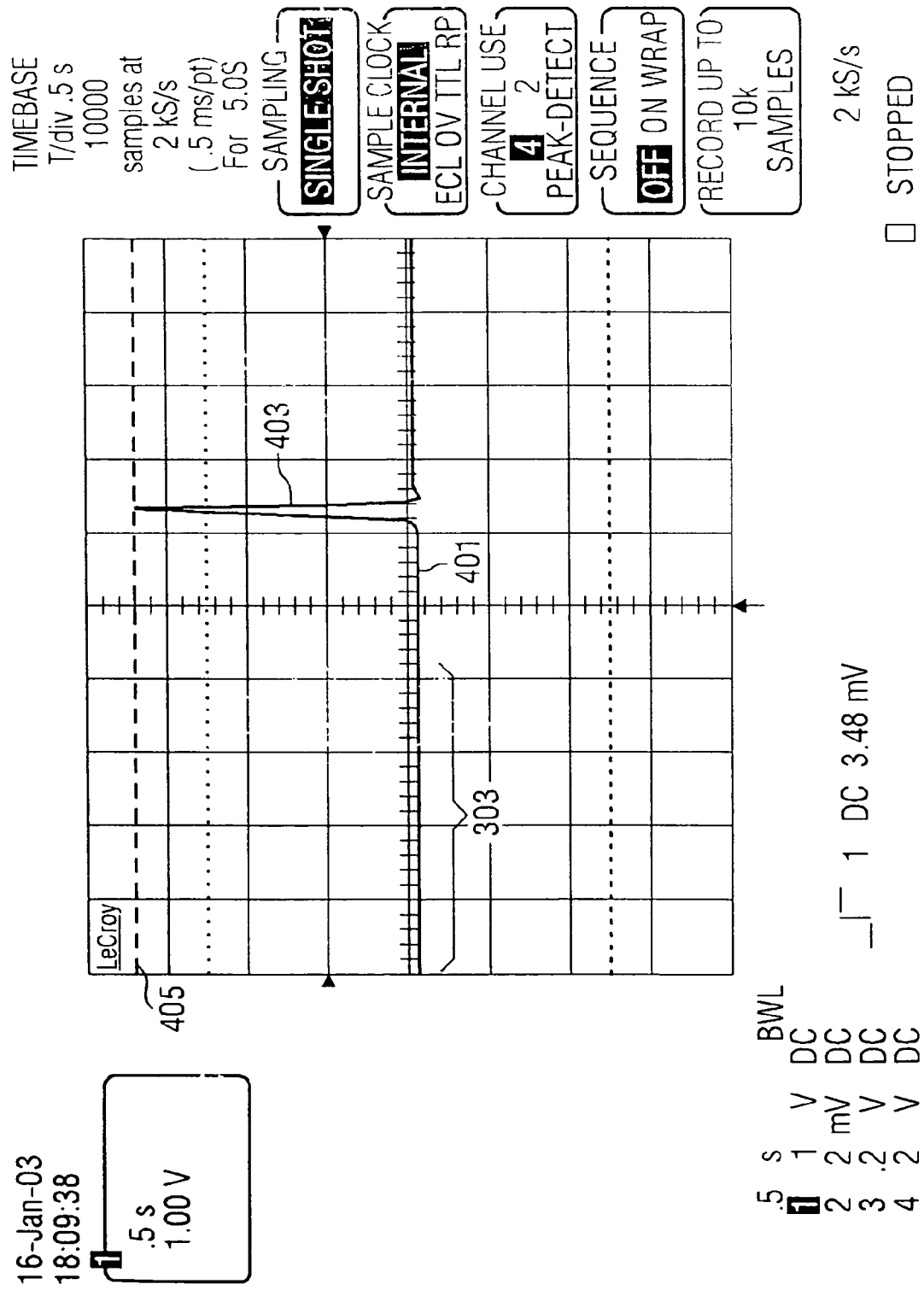
FIG. 4 is a further measurement result.

Based on the concept set forth above for obtaining a better sense signal, a measurement was performed, the result of which is illustrated in FIG. 4.

The measurement (the test) was performed with the coil illustrated in FIG. 2A or in FIG. 2B with a normal 125 kHz transponder coil for a tire pressure measurement system (TPMS).

FIG. 4 shows a voltage course 401 having an impulse 403, wherein the impulse 403 has an amplitude made clear by the vertical dashed line 405 illustrated in FIG. 4.

The signal 401 of FIG. 4 was obtained by rotation of the coil with about 2 Hz. At a rotation of the coil or the wheel with 2×7=14 Hz, the signal level would be 500 µVp, so that detection is possible without a problem. This corresponds to a speed of the car of about 50 km/h. The signal illustrated in FIG. 7 was amplified by the factor 50,000 by a pre-amplifier. The signal at the coil has an amplitude of 70 µVp. The amplitude of the signal was measured via a pre-amplifier. The displayed voltage is thus higher. The sensitivity of the usual TPMS 125 kHz low frequency receiver is 500 µVp, i.e. the above-imaged signal would be too low by a factor 7, if no inventive rotation of the coil was done.

In the measurement discussed above, a coil was used that is already now employed for other functions in TMPS modules, such as a 125 kHz LF antenna (LF=low frequency). This serves for the transfer of data at a frequency of 125 kHz. This antenna may be used in a double manner: as a 125 kHz antenna and as an earth magnetic field sensor, which leads to cost saving. Other magnetic field sensors would be considerably more expensive, which makes their employment in mass production appear doubtful.

For placing the magnetic field sensor in the further rotation, for example an electrically driven motor may be used, which turns the magnetic field sensor about an axis, so that the rotation of the wheel as well as the further rotation of the magnetic field sensor overlay such that the sense signal has the desirable higher amplitude already mentioned.

In FIG. 5 an embodiment of an inventive tire pressure sensor system is illustrated.

The tire pressure sensor system illustrated in FIG. 5 comprises an activatable tire pressure sensor 501 having an input 503 and an output 505.

The tire pressure sensor system illustrated in FIG. 5 comprises means 507 for sensing the earth magnetic field. The means 507 comprises an output 509 to which means 511 for detecting the change of a sensed earth magnetic field is coupled. The means 511 for detecting comprises an output 513 coupled to the input 503 of the activatable tire pressure sensor 501.

In the following, the functionality of the arrangement illustrated in FIG. 5 is explained.

The activatable tire pressure sensor 501 is for example built in a wheel. As it has already been mentioned, in order to achieve low energy consumption it is advantageous to activate the tire pressure sensor when this is necessary. This is for example the case when the vehicle is set in motion to forward the tire pressures as information relevant for safety to a driver. For the activation (wakeup), the activatable tire pressure sensor 501 comprises the input 503, to which the activation signal (wakeup signal) can be applied. After activation, the activatable tire pressure sensor measures the tire pressure in the respective tire and provides tire pressure measured values via the output 505 as result. The tire pressure measured values may be sent to a central evaluating unit not illustrated in FIG. 5 by means of a transmitter, wherein the transmitter is for example a radio transmitter.

For the activation of the activatable tire pressure sensor it is, however, necessary to recognize when the vehicle is set in motion. For this, the inventive apparatus for sensing rotation of a wheel may advantageously be employed, as it has already been presented in connection with the embodiment illustrated in FIG. 1.

The apparatus for sensing the rotation, consisting of the means 507 for sensing the earth magnetic field and the means 511 for detecting a change thereof, provides the activation signal via the output 513, which may be applied to the input 503 of the activatable tire pressure sensor 501. In order to illustrate this concept, the output 513 of the means 511 for detecting is coupled to the input 503 of the activatable tire pressure sensor. At this point, it is to be pointed out, however, that this coupling only represents a signal coupling. The output 513 may for example be galvanically coupled to the input 503. This may for example be realized by providing the activation signal via for example a line to the activatable tire pressure sensor. This is of advantage when both the activatable tire pressure sensor 501 and the inventive apparatus for sensing the rotation are integrated for example on a chip and arranged in a wheel as a whole. Alternatively, it is also possible, however, that the means 511 for detecting sends out the activation signal to the activatable tire pressure sensor 501 using a radio transmitter.

Independently of in which form the activation signal reaches the activatable tire pressure sensor 501, the activatable tire pressure sensor 501 is formed to receive the activation signal and sense the tire pressure in response to the activation signal.

The tire pressure sensor system illustrated in FIG. 5 is based on the earth magnetic field being used as reference for movement for activation of the tire pressure sensor 501. If the wheel starts to move, the magnetic field sensed by the means 501 for sensing the earth magnetic field changes. Thereby, a wakeup of the module is triggered and the tire pressure (tire pressure measured values) is passed to the vehicle via radio frequency carriers.

Instead of the known static magnetic field sensors, such as a Hall sensor or a magnetoresistive sensor, as it has already been mentioned, preferably a simple coil may be used. By the rotation of the wheel, a voltage is induced in the coil due to the permanent earth magnetic field.

In FIG. 6 a further embodiment of a tire pressure sensor system according to the present invention is illustrated.

The system illustrated in FIG. 6 includes a coil 601, whose inputs are coupled to a low frequency receiver 603 (LF receiver). The LF receiver 603 at the same time serves as activation signal generator (wakeup generator). The LF receiver 603 comprises an output coupled to a logic circuit 605.

The logic circuit 605 comprises a first terminal 607 as well as a second terminal 609. To the first terminal 607 of the logic circuit 605, a pressure sensor 611 is coupled. To the second terminal 609 of the logic circuit 605, however, a transmitter 613 is coupled. The transmitter 613 has an output to which an antenna 615 is coupled.

The embodiment of a tire pressure sensor illustrated in FIG. 6 is employed in a wheel tire in its entirety. The coil 601 here serves as a low frequency magnetic field movement sensor for sensing the movement (rotation) of the wheel. Due to the wheel turn, an alternating current is induced in the coil, whose momentary direction is indicated by the arrow illustrated in FIG. 6. The voltage signal is received by the generator 603, wherein the generator 603 is formed to generate, from the induced voltage signal, a signal indicating wheel turn or characterizing wheel turn with reference to the rotation speed. The generator 603 provides a signal to the logic circuit 605 as output signal, which contains information on whether the wheel has been set to motion or how high the momentary wheel speed is.

The logic circuit 605 generates a signal activating the sensor 611 on the basis of the generator signal at the output of the generator 603. The tire pressure sensor 611 then measures the tire pressure, wherein the measured tire pressure values are sent back to the logic circuit 605, so that a signal can be generated, which may for example be interpreted by a central evaluating unit arranged in a vehicle. The output signal of the logic circuit 605 is sent to the transmitter 613. The transmitter 613 may for example be a radio transmitter generating a high frequency signal, which may be sent from the antenna 615 to the central evaluating unit already mentioned. The transmitter 613 may for example be a Bluetooth transmitter.

At it follows from FIG. 6, the earth magnetic field is inventively employed for detection of the rotation of the wheel in tire pressure control systems in order to generate a wakeup signal. As it clearly follows from above explanations, the earth magnetic field strength is sufficient to apply also simple coils for sensing the earth magnetic field. This also implies that coils already present in finished tire pressure systems, which are for example employed as the 125 kHz LF antennae or 125 kHz transponder coils already mentioned, may also be used to concurrently generate an activation signal (wakeup) based on utilization of the change of the sensed earth magnetic field. This may already be taken into account at production of the module at low costs. According to the invention, in this case no additional external devices come up, so that the wakeup signal may be generated in a cost-neutral manner.

The 125 kHz transponder coil may be a transponder coil 5315TC of the company Coilcraft.

Depending on the circumstances, the inventive methods may be implemented in hardware or in software. The implementation may take place on a digital storage medium, in particular a floppy disc or a CD with electronically readable control signals, which may cooperate with a programmable computer system so that the corresponding method is executed. In general, the invention thus also consists in a computer program product with program code stored on a machine-readable carrier for the performance of the respective inventive method, when the computer program product is executed on a computer. In other words, the invention may thus be realized as a computer program with a program code for the performance of the method, when the computer program is executed on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCE NUMERAL LIST 101 means for sensing the earth magnetic field
103 means for detecting a change of the sensed magnetic field
105 output
201 coil
203 hole raster board
301 voltage course
303 first section of the voltage course 301
305 impulse
307 amplitude
308 display areas
401 voltage course
403 impulse
405 amplitude
501 activatable tire pressure sensor
503 input
505 output
507 means for sensing the earth magnetic field
509 output
511 means for detecting a change of the sensed magnetic field
513 output
601 coil
603 low frequency receiver
605 logic circuit
607 first terminal
609 second terminal
611 tire pressure sensor
613 transmitter
615 antenna

What is claimed is:

1. An apparatus for sensing rotation of a wheel, the apparatus comprising:
a sensor disposed in a wheel, the sensor operable to sense an earth magnetic field, wherein the sensor includes a magnetic field sensor, and wherein the magnetic field sensor is a coil which is also adapted for data transfer; and
a detector operable to detect a change of the sensed earth magnetic field in order to sense rotation of the wheel based on the detected change.

2. The apparatus of claim 1 wherein the sensor further comprises a driver operable to place the magnetic field sensor in a further rotation in order to obtain a sense signal based on the change of the sensed earth magnetic field.

3. The apparatus of claim 2 wherein the driver is an electric motor.

4. The apparatus of claim 1 wherein the sensor is operable to provide a sense signal comprising an amplitude and/or frequency dependent on the change of the sensed earth magnetic field, and wherein the detector is operable to sense a rotation speed of the wheel based on the amplitude and/or frequency.

5. A method comprising:
sensing an earth magnetic field;
detecting a change of the sensed earth magnetic field; and
sensing rotation of a wheel based on the detected change of the sensed earth magnetic field,
wherein sensing the earth magnetic field comprises sensing the earth magnetic field by means of a coil which is further configured as an antenna for a transfer of data.

6. An apparatus for sensing rotation of a wheel, the apparatus comprising:
a sensor disposed in a wheel, the sensor operable to sense an earth magnetic field;
a detector operable to detect a change of the sensed earth magnetic field in order to sense rotation of the wheel based on the detected change; and
an activatable tire pressure sensor operable to sense the tire pressure, wherein
the detector is further configured to provide an activation signal to the activatable tire pressure sensor based on the detected change.

7. The apparatus of claim 6, wherein the tire pressure sensor includes a coil.

8. The apparatus of claim 6, wherein the tire pressure sensor includes a Hall sensor.

9. A method comprising:
sensing an earth magnetic field;
detecting a change of the sensed earth magnetic field;
sensing rotation of a wheel based on the detected change of the sensed earth magnetic field;
generating an activation signal following the sensed rotation of the wheel; and
sensing the tire pressure in response to the activation signal.

10. The method of claim 9, wherein a coil is used to sense the earth magnetic field.

11. The method of claim 9, wherein a Hall sensor is used to sense to earth magnetic field.

12. The method of claim 9, wherein the step of sensing the earth magnetic field comprises a step of sensing the earth magnetic field by means of a coil which is further configured as an antenna for a transfer of data.

* * * * *